US008140795B2

(12) United States Patent
Challener et al.

(10) Patent No.: US 8,140,795 B2
(45) Date of Patent: Mar. 20, 2012

(54) HARD DISK DRIVE WITH WRITE-ONLY REGION

(75) Inventors: David Carroll Challener, Raleigh, NC (US); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1833 days.

(21) Appl. No.: 11/068,322

(22) Filed: Feb. 28, 2005

(65) Prior Publication Data

US 2006/0195654 A1   Aug. 31, 2006

(51) Int. Cl.
    G06F 12/00   (2006.01)
    G06F 13/00   (2006.01)
(52) U.S. Cl. .......................... 711/163; 711/154; 711/164
(58) Field of Classification Search .......... 711/163–164, 711/100, 154, 200
    See application file for complete search history.

(56) References Cited

U.S. PATENT DOCUMENTS

| | | | |
|---|---|---|---|
| 5,276,840 A * | 1/1994 | Yu | 710/35 |
| 5,664,145 A | 9/1997 | Apperley et al. | 711/117 |
| 6,038,619 A | 3/2000 | Berning et al. | 710/33 |
| 6,286,087 B1 * | 9/2001 | Ito et al. | 711/164 |
| 6,330,648 B1 * | 12/2001 | Wambach et al. | 711/163 |
| 6,477,616 B1 | 11/2002 | Takahashi | 711/111 |
| 6,502,178 B1 | 12/2002 | Olbrich | 711/202 |
| 6,553,387 B1 | 4/2003 | Cabrera et al. | 707/200 |
| 6,594,780 B1 * | 7/2003 | Shen et al. | 714/15 |
| 6,691,213 B1 | 2/2004 | Luu et al. | 711/163 |
| 6,693,754 B2 | 2/2004 | Noble et al. | 360/53 |
| 6,708,265 B1 | 3/2004 | Black | 711/207 |
| 6,715,050 B2 * | 3/2004 | Williams et al. | 711/164 |
| 6,732,292 B2 | 5/2004 | Hertz et al. | 714/8 |
| 6,738,877 B1 * | 5/2004 | Yamakawa et al. | 711/164 |
| 6,757,788 B2 | 6/2004 | Kawamoto et al. | 711/145 |
| 6,760,828 B1 | 7/2004 | Black | 711/207 |
| 2002/0015252 A1 | 2/2002 | Noble et al. | 360/72.1 |
| 2002/0145966 A1 | 10/2002 | Hirotsune et al. | 369/275.3 |
| 2002/0178338 A1 * | 11/2002 | Shibuya et al. | 711/173 |
| 2002/0199074 A1 * | 12/2002 | Kuo | 711/163 |
| 2003/0131112 A1 * | 7/2003 | Yu | 709/229 |
| 2004/0268038 A1 * | 12/2004 | Nagasoe et al. | 711/114 |
| 2006/0143417 A1 * | 6/2006 | Poisner et al. | 711/164 |

FOREIGN PATENT DOCUMENTS

JP   920030067   2/2004
WO   WO 2004102362 A1 * 11/2004

* cited by examiner

*Primary Examiner* — Tuan V. Thai
(74) *Attorney, Agent, or Firm* — John L. Rogitz

(57) ABSTRACT

The invention partitions the HDD into three areas, namely, no access, write-only, and the conventional read/write. Sensitive data (antivirus programs, back up data, etc.) is written into write-only areas, which thereafter become designated "no access" by appropriately changing their designation a data structure known as "logical block address" or "LBA". Only users having approved passwords can change the status of a "no access" block back to "write-only" or "read/write".

12 Claims, 3 Drawing Sheets

HARD DISK DRIVE WITH WRITE-ONLY REGION

I. Field of the Invention

The present invention relates generally to hard disk drives (HDD).

II. Background of the Invention

Disks such as magnetically-based hard disk drives (HDD) and optically-based compact disks (CDs) and digital video disks (DVDs) are widely used in computers for persistent data storage. Taking HDDs as an example, data is stored ("written") to the disk and subsequently may be read back from the disk.

As recognized herein when data is written to a hard disk drive, there is no good way to know whether it has been tampered with. This is disadvantageous for several applications, including data back-up (in which the user would like to be confident that data that is ostensibly a back-up copy indeed is a duplicate of the original), antivirus (so virus protection programs relied on by the user cannot be modified by a malefactor), and audit trail protection (so that embezzlers cannot alter financial records without being discovered). With these critical recognitions in mind, the invention herein is provided.

SUMMARY OF THE INVENTION

A controller is disclosed for a memory device such as a hard disk drive (HDD) or USB memory device. When implemented in a HDD, the HDD has one or more disks and a write-only region. The controller writes data into a portion of the write-only region, and designates the portion containing the data as a no access region to which any further write events are prevented absent the input of a predetermined security code. The HDD may also have a conventional read/write region to which data may be written, read, and/or overwritten.

In non-limiting implementations the write-only region can be established by a series of blocks having consecutively numbered logical block addresses (LBAs). The series of blocks thus defines a beginning block, an ending block, and a next block to be written. Initially the next block to be written is the beginning block. Writes are executed to the write-only region starting at the next block to be written. Accordingly, after "n" blocks have been written, the LBA of the next block to be written is the LBA of the beginning block plus "n". The blocks from the beginning block to the block immediately preceding the next block to be written establishes the no access region.

In another aspect, a computer implemented method includes writing data into a write-only region of a memory storage device such as a hard disk drive (HDD), and designating blocks written into the write-only region as "no access" to which access is denied to any user not inputting a predetermined code.

In still another aspect, a memory storage such as an HDD includes a controller, at least one disk having at least a write-only region, and logic for permitting writing data to, but not reading data from, the write-only region. Data written to the write-only region thereafter cannot be overwritten under any circumstances without the provision of a predetermined code.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
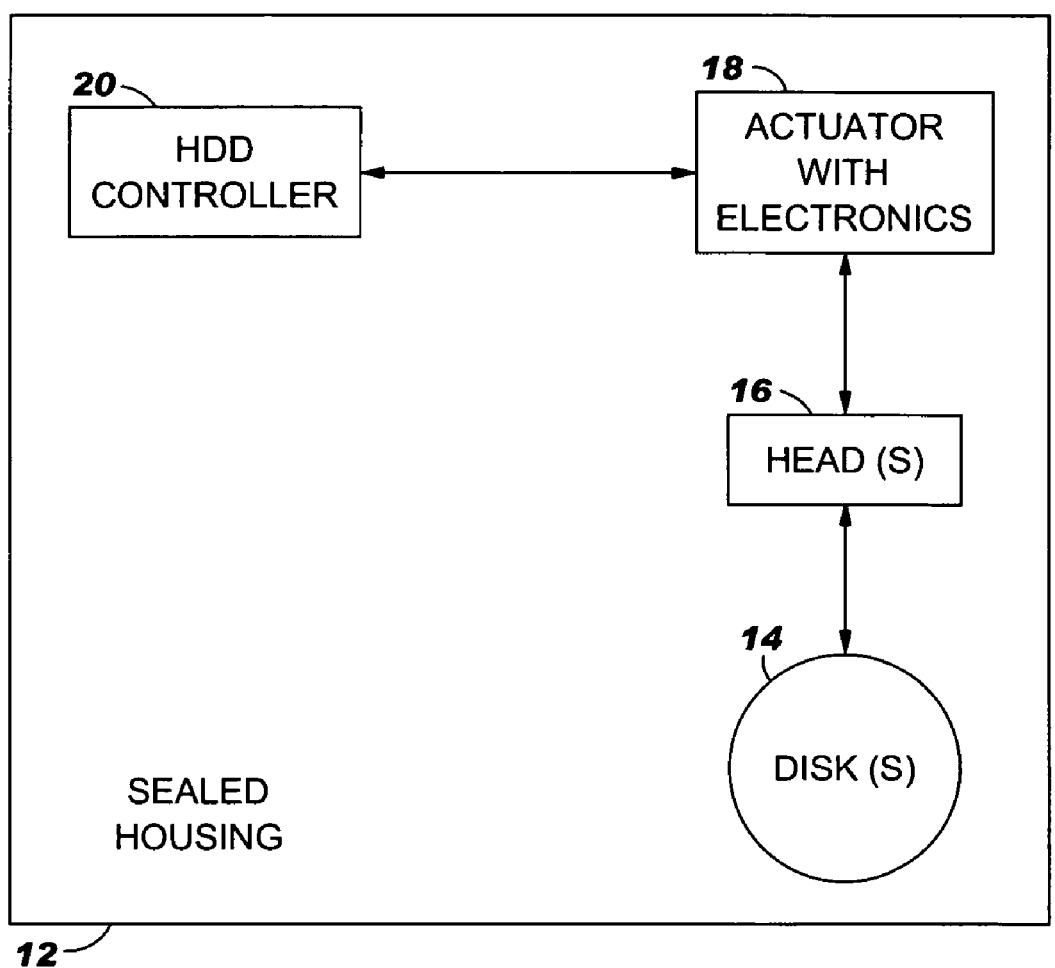
FIG. 1 is a system block diagram.

Referring initially to FIG. 1, a memory storage, such as, for example, a hard disk drive (HDD), is shown and generally designated 10. In the HDD example shown, the HDD includes a sealed housing 12 that holds one or more data storage disks 14 that can be read or written to by one or more read/write heads 16. The heads 16 are mounted on an actuator 18 that may include electronic circuits, with the actuator 18 being controlled in turn by a HDD controller 20. While the disclosure below focusses on a HDD implementation, present principles apply to other media such as, e.g., universal serial bus (USB) memory devices/keys.

The logic disclosed below may be contained in the HDD controller 20. Or, it may be contained in the actuator 18, or on chipsets that are separate from the controller 20 and actuator 18. The logic may be distributed through the components mentioned above, and may be implemented in hardware logic circuits and/or software logic circuits.

Figure 2:
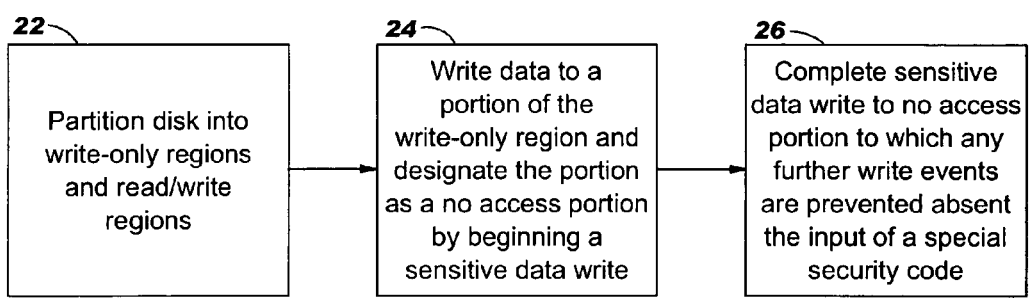
FIG. 2 is a flow chart of the present logic.
Figure 3:
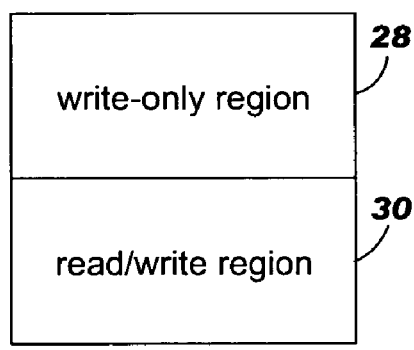
FIG. 3 is a schematic diagram of the storage area of a disk prior to writing.

In FIG. 2, block 22 indicates that initially, one or more disks 14 in the HDD is partitioned into two regions, namely, one or more write-only region(s) and one or more read/write region(s). Referring briefly to FIG. 3, a write-only region 28 and a read/write region 30 are shown. Sensitive data such as but not limited to backup data, antivirus information, and audit trail information may be written into the write-only region 28. Once written into the write-only region 28, data may not subsequently be read or overwritten except upon the provision of a special security code described further below.

On the other hand, non-sensitive data may be written into the read-write region 30, which is a conventional HDD read-write region in that data may be written to it, read from it, and old data may be overwritten by newer data. In some implementations, no read-write region need be provided, i.e., the entire HDD can be write-only when, for example, the capacity of the HDD is so great that it is not anticipated to fill the entire storage area of the HDD within the expected lifetime of the HDD.

Figure 4:
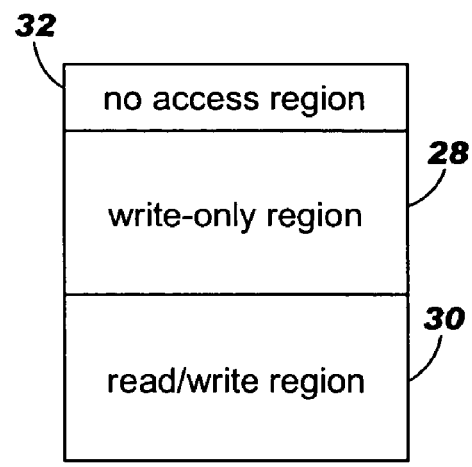
FIG. 4 is a schematic diagram of the storage area of a disk during writing.
Figure 5:
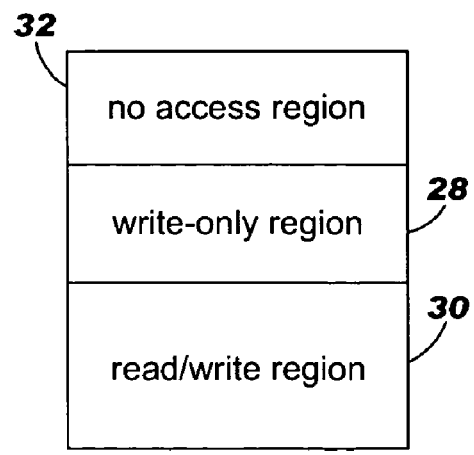
FIG. 5 is a schematic diagram of the storage area of a disk after writing.

Moving the block 24 of FIG. 2, data is written to a portion of the write-only region 28. When this happens and referring briefly to FIG. 4, the portion to which data is written becomes a no access region 32, to which subsequent reads and writes are prohibited absent the special security code. This is shown at block 26 of FIG. 2, which indicates that once the sensitive data write is complete, the sensitive data on the no access region 32 of the disc will not undergo any further write events without the input of a security code. FIG. 5 shows that the no access region 32 continues to grow as sensitive data writes are executed, at the expense of the write-only region 28.

The above logic in one specific implementation may include designating a series of blocks that have consecutively numbered LBAs as the "write-only" region 28. The first block may be designated "start", the last block in the series "end". A third label is "W", the next block to be written (at initialization W=start). After "n" blocks have been written, W=Start+n. "Start" and "end" remain unchanged. Using this convention, the HDD may be programmed to prohibit writing or reading of blocks "start" through "W−1", achieving the "no access" goal.

Should it be desired to read or overwrite data in the no access region 32, a special security code, such as a closely kept administrator password, must be rendered to the HDD, and if the code satisfies security criteria in the HDD, access to the "no access" region may be permitted. Other codes may be used, e.g., keys, etc.

While the particular HARD DISK DRIVE WITH WRITE-ONLY REGION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A controller for a memory device having at least one write-only region, the controller executing logic comprising:
   executing data writes into a portion of the write-only region; and
   designating the portion containing the data as a no access region to which any further write events and read events are prevented absent the input of a predetermined security code, the no access region growing at the expense of the write-only region in response to the execution of each of said data writes, wherein the memory device is a hard disk drive (HDD), and the HDD has at least one read/write region, wherein the write-only region is established by a series of blocks having consecutively numbered logical block addresses (LBAs); wherein the series of blocks defines a beginning block, an ending block, and a next block to be written, wherein initially the next block to be written is the beginning block, writes being executed to the write-only region starting at the next block to be written.

2. The controller of claim 1, wherein after "n" blocks have been written, the LBA of the next block to be written is the LBA of the beginning block plus "n".

3. The controller of claim 2, wherein the blocks from the beginning block inclusive to the block, inclusive, immediately preceding the next block to be written establish the no access region.

4. The controller of claim 1, the controller being in combination with a host computer.

5. A computer implemented method comprising:
   executing data writes to a write-only region of a memory device selected from a group including hard disk drives (HDD) and USB memory devices; and
   in response to each of said data writes to the write-only region of the memory device, designating only blocks written into the write-only region as "no access" to which access is denied to any user not inputting a predetermined code, wherein the memory device is a HDD, and the HDD has at least one read/write region, wherein the write-only region is established by a series of blocks having consecutively numbered logical block addresses (LBAs), wherein the series of blocks defines a beginning block, an ending block, and a next block to be written, wherein initially the next block to be written is the beginning block, writes being executed to the write-only region starting at the next block to be written.

6. The computer implemented method of claim 5, wherein after "n" blocks have been written, the LBA of the next block to be written is the LBA of the beginning block plus "n".

7. The computer implemented method of claim 6, wherein the blocks from the beginning block, inclusive, to the block, inclusive immediately preceding the next block to be written establish the no access region.

8. A hard disk drive (HDD), comprising:
   at least one controller;
   at least one disk having at least a write-only region; and
   logic for permitting writing data to, but not reading data from, the write-only region, wherein after each data write to the write-only region, data written to the write-only region thereafter is not overwritten under any circumstances without the provision of a predetermined code, wherein the write-only region is established by a series of blocks having consecutively numbered logical block addresses (LBAs), wherein the series of blocks defines a beginning block, an ending block, and a next block to be written, wherein initially the next block to be written is the beginning block, writes being executed to the write-only region starting at the next block to be written.

9. The HDD of claim 8, wherein the HDD has at least one read/write region.

10. The HDD of claim 8, wherein after "n" blocks have been written, the LBA of the next block to be written is the LBA of the beginning block plus "n".

11. The HDD of claim 10, wherein the blocks from the beginning block, inclusive to the block, inclusive immediately preceding the next block to be written establish a no access region.

12. The HDD of claim 8, the controller being in combination with a host computer.

* * * * *